United States Patent
Borella et al.

(10) Patent No.: US 6,269,099 B1
(45) Date of Patent: Jul. 31, 2001

(54) PROTOCOL AND METHOD FOR PEER NETWORK DEVICE DISCOVERY

(75) Inventors: Michael S. Borella, Naperville; Guido M. Schuster, Des Plaines; Jerry J. Mahler, Prospect Heights; Ikhlaq Sidhu, Buffalo Grove, all of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/108,935

(22) Filed: Jul. 1, 1998

(51) Int. Cl.[7] .......................... H04L 12/28; H04L 12/56; H04J 3/16
(52) U.S. Cl. .......................... 370/389; 370/401; 370/466
(58) Field of Search .................................. 370/231, 236, 370/352, 389, 392, 401, 465, 469, 475, 466; 709/245

(56) References Cited

U.S. PATENT DOCUMENTS

| | | |
|---|---|---|
| 5,159,592 | 10/1992 | Perkins . |
| 5,227,778 | 7/1993 | Vacon et al. . |
| 5,550,984 | 8/1996 | Gelb . |
| 5,636,216 | 6/1997 | Fox et al. . |
| 5,708,655 | 1/1998 | Toth et al. . |
| 5,793,763 | 8/1998 | Mayes et al. . |
| 5,812,819 | 9/1998 | Rodwin et al. . |
| 5,867,660 | 2/1999 | Schmidt et al. . |
| 5,872,847 | 2/1999 | Boyle et al. . |
| 5,892,924 | * 4/1999 | Lyon et al. ............... 395/200.75 |
| 6,055,236 | 4/2000 | Nessett et al. . |
| 6,055,561 | * 4/2000 | Feldman et al. ............... 709/200 |
| 6,058,421 | * 5/2000 | Fijolek et al. ............... 709/225 |
| 6,101,543 | * 8/2000 | Alden et al. ............... 709/229 |
| 6,104,711 | * 8/2000 | Voit ............... 370/352 |
| 6,115,751 | * 9/2000 | Tam et al. ............... 709/240 |

OTHER PUBLICATIONS

G. Montene, Internet Engineering Task Force, Internet Draft, "Negotiated Address Reuse" (NAR), <draft–montenegro–aatn–nar–00.txt>, May 1998, pp. 1 to 22.

George Tsirtis, Alan O'Neill, Internet Engineering Task Force, Internet Draft, "NAT Bypass for End 2 End 'Sensitive' Applications," <draft–tsirtsis–nat–bypass–00.txt>, Jan. 1998, pp. 1 to 5.

(List continued on next page.)

Primary Examiner—Alpus H. Hsu
Assistant Examiner—Duc Ho
(74) Attorney, Agent, or Firm—McDonnell Boehnen Hulbert & Berghoff, Stephen Lesavich (57) ABSTRACT

A protocol and methods for peer network device discovery is presented. The peer discovery protocol includes a peer discovery marker than can be used with an existing networking protocol such as Transmission Control Protocol ("TCP") to discover peer network devices. The peer discovery protocol also includes a peer discovery table to record network addresses of peer network devices and their associated host network devices. The peer discovery method allows a first peer network device such as an edge router, to send out a peer discovery request with the peer discovery protocol to other peer network devices as the peer network device is sending data packets for a host network device. Once a second peer network device receives a peer discovery request, the second peer network device attempts to establish a two-way, peer-to-peer data-flow to the first peer network device that sent the peer discovery requests. The peer discovery protocol and methods allow error correction, encryption, compression and other "intelligent" services to be added to peer network devices such as edge routers. The peer discovery protocol and peer discovery methods may enhance performance, reliability and security of data transmitted over the Internet to and from Autonomous Systems, subnets, or other computer networks.

28 Claims, 9 Drawing Sheets

OTHER PUBLICATIONS

George Tsirtis, Pyda Srishuresh, Internet Engineering Task Force, Internet Draft, "Network Address Translation—Protocol Translation" (NAT–PT), <draft–ietf–ngtrans–natpt–04.txt>, Jan. 1999, pp. 1 to 13.

Jeffrey Lo, K, Taniguchi, Internet Engineering Task Force, Internet Draft, "IP Host Network Address (and port) Translation," <draft–ietf–nat–hnat–00.txt>, Nov. 1998, pp. 1 to 13.

Michael Borella, David Grabelsky, Ikhlaq Sidhu, Brian Petry, Internet Engineering Task Force, Internet Draft, "Distributed Network Address Translation," <draft–borella–aatn–dnat–01.txt>, Oct. 1998, pp. 1 to 21.

P. Srisuresh, G. Tsirsis, P. Akkiraju, A. Heffernan, Internet Engineering Task Force, Internet Draft, "DNS Extensions to Network Address Translators" (DNS_ALG), <draft–ietf–nat–dns–01.txt>, Oct. 1998, pp. 1 to 24.

P. Srisuresh, Internet Engineering Task Force, Internet Draft "Security for IP Network Address Translator (NAT) Domains," <draft–ietf–nat–security–00.txt.>, Nov. 1998, pp. 1 to 11.

P. Srisuresh, K. Eg, Internet Engineering Task Force, Internet Draft, "The IP Network Address Translator" (NAT), <draft–rfced–into–srisuresh–05.txt>, Feb. 1998, pp. 1 to 24.

P. Srisuresh, K. Egev, Internet Engineering Task Force, Internet Draft, "Traditional IP Network Address Translator (Traditional NAT)," <draft–ietf–nat–traditional–01.txt>, Oct. 1998, pp. 1 to 17.

P. Srisuresh, Matt Holdrege, Internet Engineering Task Force, Internet Draft, "IP Network Address Translator (NAT) Terminology and Consideration," <draft–ietf–nat–terminology–01.txt>, Oct. 1998, pp. 1 to 28.

Praveen Akkiraju, Yakov Rekhter, Internet Engineering Task Force, Internet Draft, "A Multihoming Solution Using NATs" <draft–akkiraju–nat–multihoming–00.txt>, Nov. 1998, pp. 1 to 32.

R. G. Moskowitz, Internet Engineering Task Force, Internet Draft, "Network Address Translation Issues with IPsec," <draft–moskowitz–net66–vpn–00.txt>, Feb. 5, 1998, p. 1 to 8.

R. Thay, N. Dorasawa and R. Gle, Internet Engineering Task Force, Internet Draft "IP Security," <drat–ietf–ipsec–doc–roadmap–02.txt.>, Nov. 1997, pp. 1 to 12.

T. Hain, Internet Engineering Task Force, Internet Draft, "Architectural implications of NAT," <draft–iab–nat–implications–02.txt>, Oct. 1998, pp. 1 to 14.

W.T. Teo, S.W. Yeeow, R. Singh, Internet Engineering Task Force, Internet Draft, "IP Relocation Through Twice Network Address Translator," <draft–ietf–nat–rnat–00.txt>, Feb. 1999, pp. 1 to 20.

W.T. Teo, S.W. Yeow, R. Singh, Internet Engineering Task Force, Internet Draft, "Reverse Twice Network Address Translators" (RAT), <draft–teoyeow–mip–rat–0.1txt>, Dec. 1998, pp. 1 to 20.

W.T. Teo, Y. Li, Internet Engineering Task Force, Internet Draft, "Mobile IP Extension for Private Internets Support," <draft–teoyli–mobiliep–mvpn–02.txt>, Feb. 1999, pp. 1 to 24.

Yakov Rekhter, Internet Engineering Task Force, Internet Draft, "Implications of NATs on the TCP/IP Architecture," <draft–ietf–nat–arch–implications–00.txt>, Feb. 1999, pp. 1 to 7.

* cited by examiner

FIG. 1

FIG. 3A
PEER DISCOVERY MARKER

FIG. 3B

PEER DISCOVERY TABLE

FIG. 4A
TCP/IP SYN SEGMENT

FIG. 4B
TCP/IP SYN ACK SEGMENT

FIG. 4C
TCP/IP ACK SEGMENT

FIG. 8A

PEER DISCOVERY TABLE
(STORED ON 20)

FIG. 8B

PEER DISCOVERY TABLE
(STORED ON 16)

PROTOCOL AND METHOD FOR PEER NETWORK DEVICE DISCOVERY

FIELD OF INVENTION

This invention relates to computer networks. More specifically, it relates to a protocol and method for peer network device discovery in computer networks.

BACKGROUND OF THE INVENTION

The Internet is a world-wide network of interconnected computers. One component of the Internet includes a large number of individual networks called Autonomous Systems ("AS"). Autonomous Systems include network topologies that typically have a single administrative entity. Examples of Autonomous Systems include universities (e.g., mit.edu, wisconsin.edu, etc.), corporations (3com.com, microsoft.com, etc.) and Internet Service Providers ("ISP") (e.g., aol.com, mci.com, etc.). An individual Autonomous System may include one or more Local Area Networks ("LAN") connected by bridges or routers. As is known in the art, bridges store and forward data frames between network topologies, while routers translate differences between network protocols and route data packets to appropriate devices on a network topology. An Autonomous System may also include Wide Area Networks ("WAN") running point-to-point or switched protocols.

Most Autonomous Systems comprise LANs connected by bridges or routers and only carry traffic to or from their own domain. Such Autonomous Systems are referred to as "stub" or "edge" networks and are typically interconnected to the Internet by a number of independent high speed backbone networks. Connectivity to the Internet in Autonomous Systems is often ad-hoc and based on administrative preferences rather than performance criteria. For example, network traffic between a first Autonomous System and a second Autonomous System in the same city may pass through another city tens or hundreds of miles away since the first and second Autonomous Systems may connect to the Internet through different backbones.

In some cases, multiple edge networks may be part of the same administrative entity. Large organizations with multiple sites use Virtual Private Networks ("VPN") comprising multiple edge networks. Instead of using dedicated long-haul lines between sites, a VPN with Autonomous Systems connects each site through the Internet with an "edge router" or "firewall" typically capable of data encryption and/or data authentication. Data packets, such as Internet Protocol ("IP") packets are encrypted and routed to the Internet traveling between multiple sites in the VPN. As is known in the art, IP is an addressing protocol designed to route traffic within a network or between networks.

Within an Autonomous System, routing and connectivity are typically determined by the organization's network administrator. Routing can be either static (e.g., statically assigned into a network device) or dynamic (e.g., using routing protocols such as Routing Internet Protocol ("RIP"), Open Shortest Path First ("OSPF"), etc.). For small to medium size Autonomous Systems, internal routes to the Internet do not change very often. Incoming and outgoing Internet traffic typically passes through a single router called a "gateway" or "edge router." As is known in the art, a gateway stores and forwards data packets between dissimilar network topologies. However, on the Internet, routing is typically very dynamic. Paths between Autonomous Systems through the Internet may change minute-by-minute or they may remain static for long periods of time (e.g., days or weeks). Paths between Autonomous Systems may traverse several different backbones to complete an Internet connection. Routing on the Internet is discussed in "End-to-end routing behavior on the Internet," by V. Paxson in *IEEE/ACM Transactions on Networking,* Vol. 5, No. 5, pp. 601–615, Octerber 1997, incorporated herein by reference.

There are several problems associated with two or more Autonomous Systems with edge routers or firewalls using static routine to connect to the Internet, which uses dynamic routing. The Internet typically suffers from significant performance problems including excessive data packet delays and data packet losses that may addressly affect the Autonomous Systems. The data packet delays and losses typically occur at public Network Access Points ("NAP") and private switches. Within each Autonomous System, network administration planning and fault tolerance can accommodate reasonable traffic growth for Internet connections. However, at Network Access Points, it is difficult to upgrade and maintain edge routers because multiple administrative entities for multiple Autonomous Systems are involved.

There have been attempts to provide "intelligent" capabilities to edge routers. Intelligent edge router capabilities may include: Forward Error Correction ("FEC"), where loss resiliency is achieved by employing Forward Error Correcting Schemes, such as eXclusive-OR ("XOR"), Reed-Solomon codes, or other forward error correcting schemes known in the art; encryption, where performance and end-to-end privacy is enhanced with edge routers that encrypt packets that are being sent to edge networks with similar capabilities; compression, where performance is increased and bandwidth is reduced if packets are compressed and sent edge-to-edge; or other intelligence.

The "intelligent" edge router services described above and other services known in the art typically require that edge routers be able to identify each other (e.g., to negotiate an encryption or compression scheme). However, there is currently no mechanism to allow edge routers to identify one other using networking protocols (e.g., Transmission Control Protocol "TCP" ). As is known in the art, TCP provides a connection-oriented, end-to-end reliable protocol designed to fit into a layered hierarchy of protocols that support multi-network applications. Thus, it is desirable to provide a mechanism to allow "intelligent" edge routers to identify one another using networking protocols and increase network performance.

SUMMARY OF THE INVENTION

In accordance with a preferred embodiment of the present invention, problems associated with allowing "intelligent" edge routers to identify one another are overcome. A peer discovery protocol and peer discovery methods for peer network device discovery is presented. The peer discovery protocol includes a peer discovery marker for allowing a network device to discover a peer network device and a peer discovery table for storing peer network device information from a peer discovery marker. In a preferred embodiment of the present invention, the peer discovery marker is used as an additional option with an existing networking protocol such as TCP to allow discovery of peer network devices. However, the present invention is not limited to using the peer discovery marker with TCP, and other networking protocols could also be used.

The peer discovery table is maintained by a peer network device and is used with information from the peer discovery marker to record the existence of peer network devices. The peer table provides peer network device information in terms of two-way peer-to-peer data "flows" between subnets (e.g., peer network devices and associated host network devices) rather than connections between host network devices as is typically the case with router tables.

One aspect of a peer discovery method for a preferred embodiment of the present invention includes receiving an original first data packet from a first network device (e.g., a host network device) on a second network device (e.g., an edge router) on a first network. The first data packet (e.g., TCP/IP) is used to establish a connection from the first network device on the first network to a fourth network device on a second network (e.g., a host network device to another host network device). A peer discovery marker from a peer discovery protocol is added to a header in the first data packet on the second network device to create a modified first data packet as the packet passes through the second network device. The peer discovery marker includes a network address for the second network device that is trying to discover a peer network device. In a preferred embodiment of the present invention, the peer discovery marker is added as an additional networking option to a networking protocol such as TCP. The modified first data packet is sent from the second network device on the first network to a third network device on the second network via the third network (e.g., the Internet).

Another aspect of the peer discovery method for a preferred embodiment for the present invention includes receiving a modified first data packet on the third network device on the second network via the third network. Information from a peer discovery marker is extracted and stored in a first peer discovery table on the third network device. The peer discovery marker is deleted from the header on the modified first data packet on the third network device to recover the original first data packet. The original first data packet is sent to a fourth network device on the second network to help establish a connection between the first network device and the fourth network device.

Another aspect of the peer discovery method for a preferred embodiment for the present invention includes creating a second data packet on the third network device to establish a two-way peer-to-peer data flow to the peer second network device. The second data packet is created after the third network device receives a modified first data packet with a peer discovery marker. The second data packet can be a TCP, User Datagram Protocol ("UDP") or other networking protocol data packet. As is known in the art, UDP provides a connectionless mode of communications with datagrams in an interconnected set of networks. The third network device adds its own network address and the network address of its associated host network device to the second data packet (e.g., IP addresses). The third network device sends the second data packet to the peer second network device via the third network (e.g., the Internet).

Information from the second data packet is extracted and stored in a second peer discovery table on the second network device, thereby providing network addresses for establishing a two-way, peer-to-peer data flow between the peer second network device and the peer third network device (e.g., peer edge routers) via the third network (e.g., the Internet).

In a preferred embodiment of the present invention, the first network device is a host computer, the second network device is an edge router, the third network device is an edge router, the fourth network device is a host computer. The first network and second networks are Autonomous Systems and the third network is the Internet. The first and second data packets are TCP/IP data packets, and the header including the peer discovery marker is a TCP header. However, the present invention is not limited to these network components and other network components could also be used.

The peer discovery protocol and peer discovery methods allow peer edge routers and other peer network devices to discover one another across a network like the Internet and provide "intelligent" edge router services. The peer discovery protocol and peer discovery method of a preferred embodiment of the present invention may enhance performance, reliability and security of data transmitted over the Internet to and from Autonomous Systems or other networks.

The foregoing and other features and advantages of a preferred embodiment of the present invention will be more readily apparent from the following detailed description, which proceeds with references to the accompanying drawings.

DETAILED DESCRIPTION OF A PREFERRED EMBODIMENT

Network System

Figure 1:
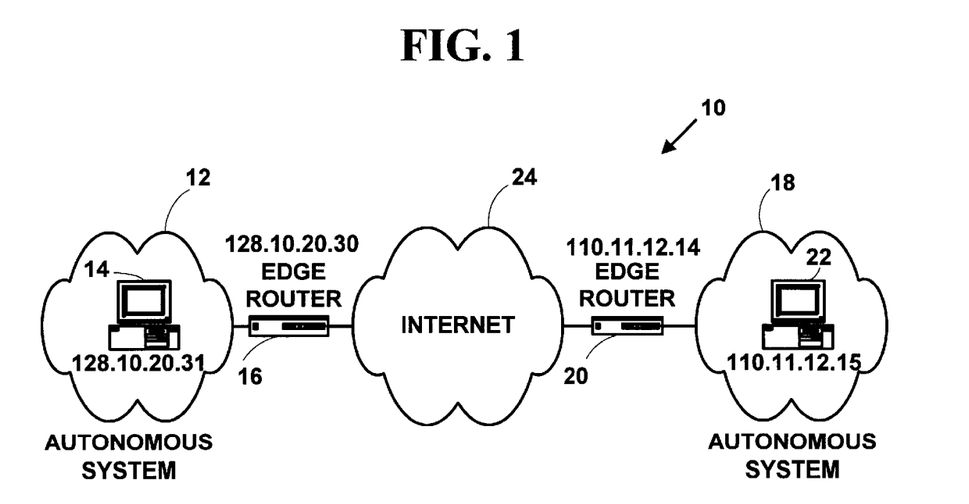
FIG. 1 is a block diagram illustrating a network system for peer network address discovery.

FIG. 1 is a block diagram illustrating a network system 10 for preferred embodiment of the present invention. Network system 10 includes a first network 12 with multiple network devices, two of which are illustrated. First network 12 includes a first network device 14 and a second network device 16. Second network 18 also includes multiple network devices, two of which are illustrated. Second network 18 includes a third network device 20 and a fourth network device 22. Second network device 16 and third network device 20 are connected via a third network 24 (e.g., the Internet).

In a preferred embodiment of the present invention, first network device 14 is a host network device (e.g., a computer), second network device 16 and third network device 20 are peer network devices (e.g., edge routers) and fourth network device 22 is a host network device. First network 12 and second network 18 are Autonomous Systems and third network 24 is the Internet. However, other network devices, network types and network components can also be used and the present invention is not limited to the network devices, network types and network components described for a preferred embodiment. In addition, although illustrated with four network devices, network system 10 typically includes tens to thousands of network devices in networks (12, 18).

An operating environment for network devices of a preferred embodiment the present invention include a processing system with at least one high speed Central Processing Unit ("CPU") and a memory system. In accordance with the practices of persons skilled in the art of computer programming, the present invention is described below with reference to acts and symbolic representations of operations that are performed by the processing system, unless indicated otherwise. Such acts and operations are referred to as being "computer-executed" or "CPU executed." Although described with one CPU, alternatively multiple CPUs may be used for a preferred embodiment of the present invention.

The memory system may include main memory and secondary storage. The main memory is high-speed random access memory ("RAM"). Main memory can include any additional or alternative high-speed memory device or memory circuitry. Secondary storage takes the form of long term storage, such as Read Only Memory ("ROM"), optical or magnetic disks, organic memory or any other volatile or non-volatile mass storage system. Those skilled in the art will recognize that the memory system can comprise a variety and/or combination of alternative components.

It will be appreciated that the acts and symbolically represented operations include the manipulation of electrical signals by the CPU. The electrical signals cause transformation of data bits. The maintenance of data bits at memory locations in a memory system thereby reconfigures or otherwise alters the CPU's operation. The memory locations where data bits are maintained are physical locations that have particular electrical, magnetic, optical, or organic properties corresponding to the data bits.

The data bits may also be maintained on a computer readable medium including magnetic disks, optical disks, organic disks and any other volatile or non-volatile mass storage system readable by the CPU. The computer readable medium includes cooperating or interconnected computer readable medium, which exist exclusively on the processing system or may be distributed among multiple interconnected processing systems that may be local or remote to the processing system.

Network Device Protocol Stack

Figure 2:
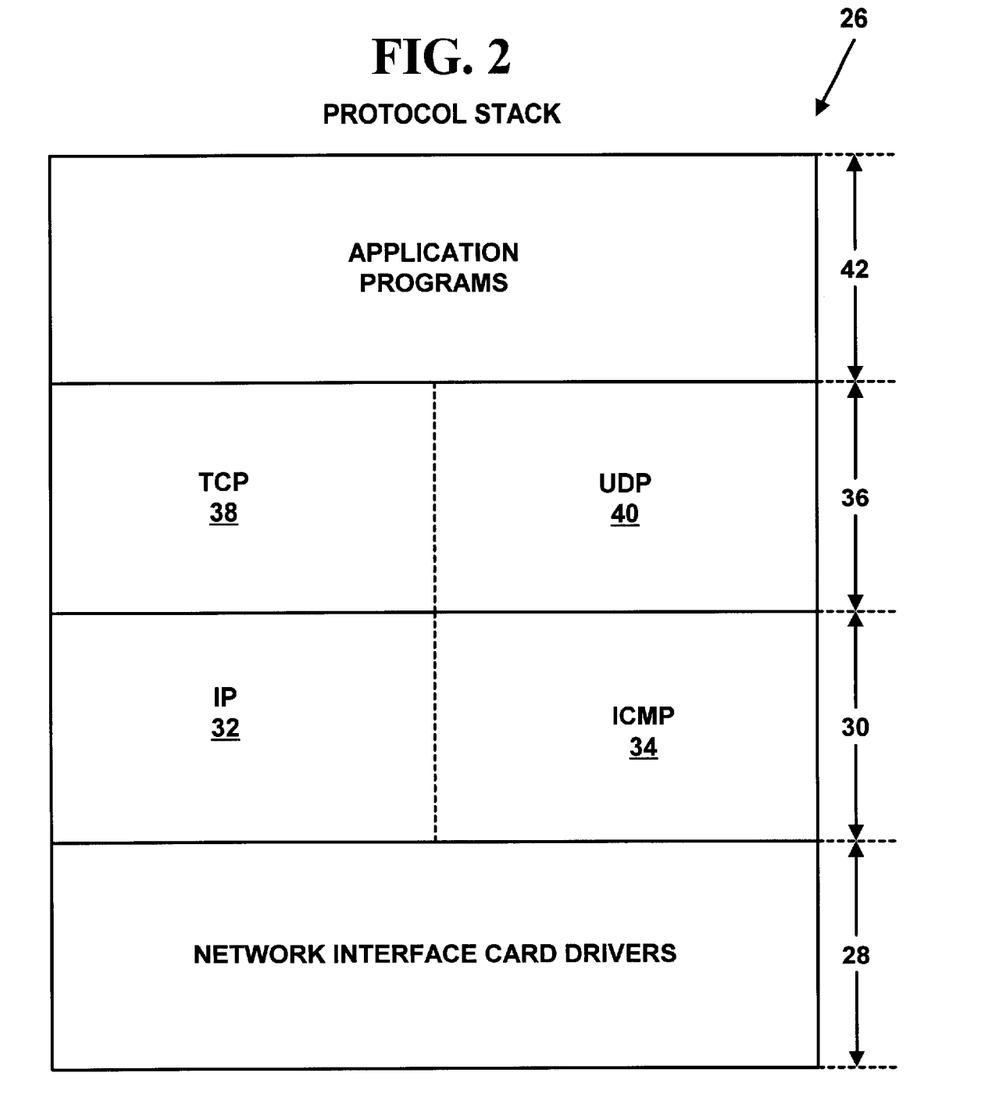
FIG. 2 is a block diagram illustrating a protocol stack for a network device.

FIG. 2 is a block diagram illustrating a layered protocol stack 26 for a network device (e.g., 14, 16, 20, and 22) in network system 10. Layered Protocol stack 26 is described with respect to Internet Protocol suites comprising from lowest-to-highest, a link, network, transport and application layer. However, more or fewer layers could also be used, and different layer designations could also be used for the layers in protocol stack 26 (e.g., layering based on the Open Systems Interconnection ("OSI") model).

Network devices (14, 16, 20, and 22) are connected to networks (12, 18, and 24) with a link layer 28. Link layer 28 includes Network Interface Card ("NIC") drivers for hardware network devices connecting the network devices to a network (e.g., an Ethernet NIC). Above link layer 28 is a network layer 30. Network layer 30, includes an Internet Protocol ("IP") layer 32. As is known in the art, IP 32 is an addressing protocol designed to route traffic within a network or between networks. IP layer 32, hereinafter IP 32, is described in Internet Engineering Task Force ("IETF") Request For Comments ("RFC") RFC-791, incorporated herein by reference. In addition to IP 32, other protocol layers may be used in network layer 30 including an Internet Control Message Protocol ("ICMP") layer 34.

ICMP layer 34, hereinafter ICMP 34, is used for network management. The main functions of ICMP 34 include error reporting, reachability testing (e.g., "pinging") congestion control, route-change notification, performance, subnet addressing and other maintenance. For more information on ICMP 34 see RFC-792, incorporated herein by reference.

Above network layer 30 is a transport layer 36. Transport layer 36 includes a Transmission Control Protocol ("TCP") layer 38 and a User Datagram Protocol ("UDP") layer 40. TCP layer 38, hereinafter TCP 38, provides a connection-oriented, end-to-end reliable protocol designed to fit into a layered hierarchy of protocols which support multi-network applications. TCP 38 provides for reliable inter-process communication between pairs of processes in network devices attached to distinct but interconnected networks. For more information on TCP 38 see RFC-793, incorporated herein by reference.

UDP layer 40, hereinafter UDP 40, provides a connectionless mode of communications with datagrams in an interconnected set of computer networks. UDP 40 provides a transaction-oriented datagram protocol, where delivery and duplicate packet protection are not guaranteed. For more information on UDP 40 see RFC-768, incorporated herein by reference. Both TCP 38 and UDP 40 are not both required in protocol stack 26.

Above transport layer is an application layer 42 where application programs reside to carry out desired functionality for a network device reside (e.g., application programs to provide "intelligent" services). More or fewer protocol layers can also be used in protocol stack 26.

Peer Discovery Protocol

Figure 3A:
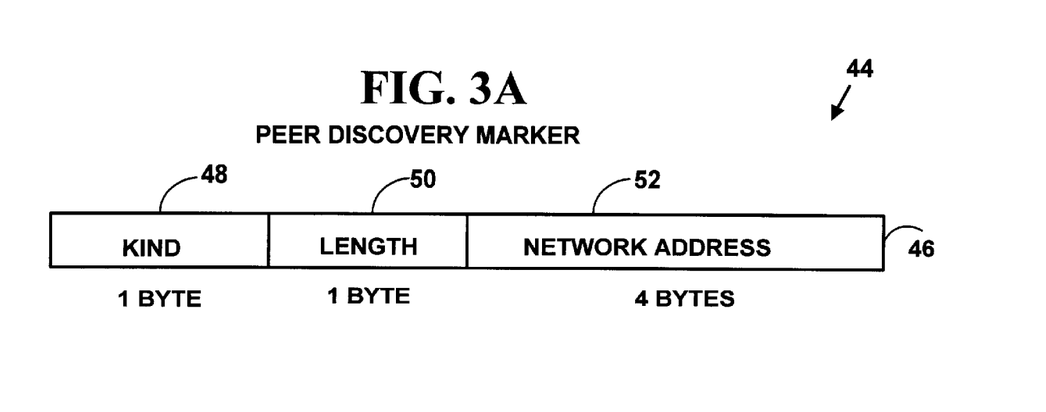
FIGS. 3A and 3B are block diagrams illustrating components of a peer discovery protocol.

FIGS. 3A and 3B are block diagrams illustrating components of a peer discovery protocol 44. However, more or fewer peer discovery protocol components could also be used. As is illustrated in FIG. 3A, peer discovery protocol 44 includes a peer discovery marker 46. Peer discovery marker includes a kind-field 48, a length-field 50 and a network address-field 52. However, more or fewer fields could also be used in peer discovery marker 46. In a preferred embodiment of the present invention, peer discovery marker 46 includes a 1-byte kind-field 48 containing a unique number (e.g., 128). Length-field 50 is a 1-byte field indicating a length of the marker in bytes (e.g., 6 bytes). Network address-field 52 is a 4-byte field containing a network address (e.g., IP address) of a network device that wishes to be discovered. However, other field sizes and values could also be used and the present invention is not limited to the field sizes and values described.

Figure 3B:
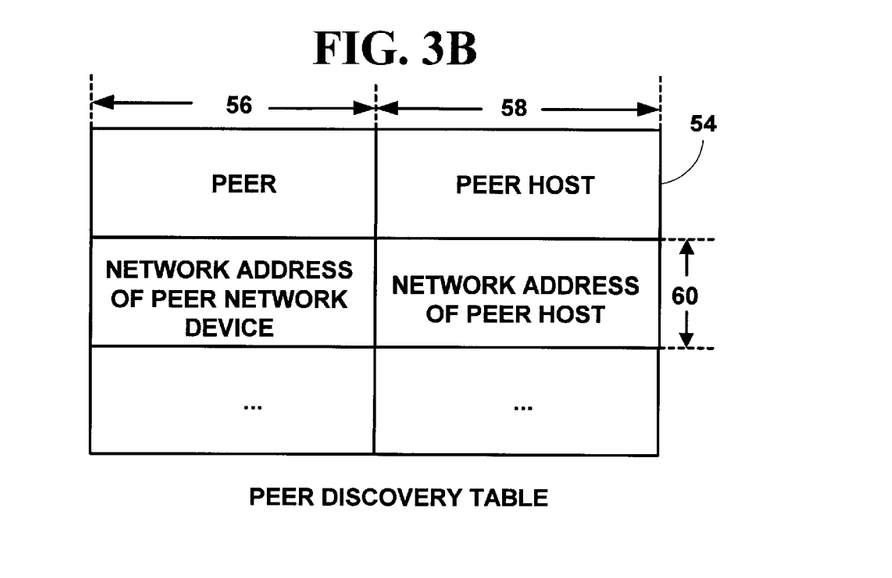

As is illustrated in FIG. 3B, peer discovery protocol 44 also includes a peer discovery table 54. Peer discovery table 54 includes a first column 56, or "peer-field", to store network addresses for peer network devices. Peer discovery table 54 also includes a second column 58, or "peer host-field", to store network addresses for host network devices associated with the peer network devices. An exemplary peer discovery table entry is illustrated by row 60. However, more or fewer columns could also be used in peer discovery table 54.

Network Device TCP Connection Establishment

Figure 4A:
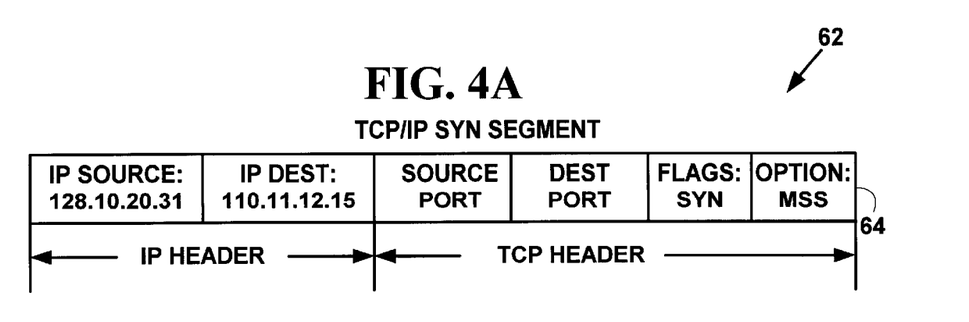
FIGS. 4A, 4B and 4C are block diagrams illustrating TCP/IP three-way handshake segments for establishing a TCP connection.
Figure 4B:
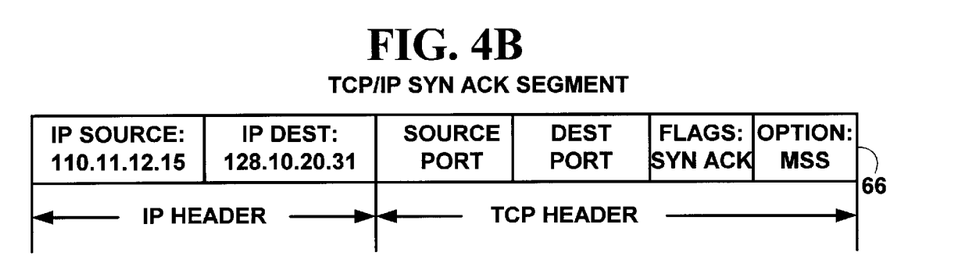
Figure 4C:
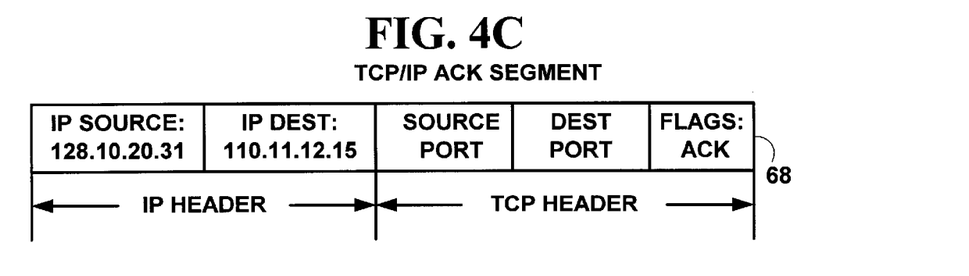

For two network devices to establish a connection with TCP 38, a TCP 38 three-way handshake is used. FIGS. 4A, 4B and 4C are block diagrams illustrating TCP/IP three-way handshake segments 62. As an example, first network device 14 desires to establish a TCP 38 connection with fourth network device 22. First network device 14 transmits a TCP 38 segment with a SYnchronize sequence Numbers ("SYN") flag set, called a "TCP 38 SYN segment" to fourth network device 22 using IP 32. FIG. 4A illustrates an exemplary TCP/IP SYN segment 64 sent from first network device 14 to fourth network device 22. TCP/IP SYN segment 64 typically contains a TCP 38 Option for advertising a Maximum Segment Size ("MSS") that the network device can accept. TCP 38 allows multiple configuration Options to be set. For more information on TCP 38 Options see RFC-793. TCP/IP SYN segment 64 illustrates an exemplary IP 32 address for first network device 14 of 128.10.20.31 as source IP 32 address and an IP 32 address for fourth network device 22 of 110.11.12.15 as destination IP 32 address. TCP/IP SYN segment 64 includes other fields that are normally set in the segments illustrated in FIG. 4. However, such fields (e.g., TCP 38 header length, TCP 38 checksum, IP 32 total length) are not illustrated in FIG. 4. For more information on such fields see RFC-793.

FIG. 4B illustrates an exemplary TCP/IP SYN ACKnowledgment segment 66. Fourth network device 22 responds to TCP/IP SYN segment 64 with "TCP/IP SYN ACK segment" 66 with the TCP 38 SYN, ACKnowledgment ("ACK") and MSS option flags set and the IP 32 source and destination addresses reversed.

FIG. 4C illustrates an exemplary TCP/IP ACK segment 68. First network device 14 responds to TCP/IP SYN ACK segment 66 with a "TCP/IP ACK segment" 68 with ACK flags set. No TCP 38 option flags are set in the TCP/IP ACK segment.

The TCP/IP segments illustrated in FIGS. 4A, 4B and 4C do not contain any data. The segments are sent in a data packet as TCP 38 and IP 32 headers only with no data segment. After sending the TCP/IP ACK segment 68, a TCP 38 connection is established between first network device 14 and fourth network device 22. TCP 38 data can then be exchanged using IP 32 via third computer network 24 (e.g., the Internet).

Peer Network Device Discovery

As was illustrated above, first network device 14 on first network 12 typically initiates a TCP 38 connection to fourth network device 22 on second network 18 via third network 24. It is desirable to allow second network device 16 functioning as an "edge router" to discover a network address of its peer edge router (e.g., third network device 20) as the TCP 38 connection between host network devices first network device 14 and fourth network device 22 is being established. Once the edge routers have discovered each other, they can establish a two-way peer-to-peer "data flow" (i.e., another TCP 38 channel or a UDP 40 channel) between themselves and transmit information such as "intelligent" routing capabilities, requests, or commands and other information. Peer discovery is accomplished using peer discover protocol 44.

Figure 5:
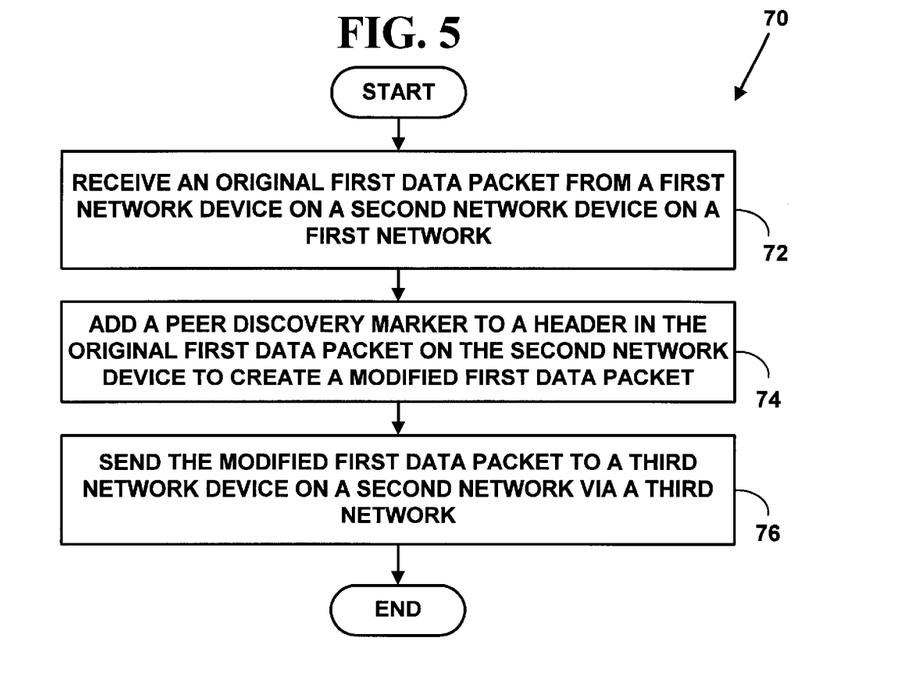
FIG. 5 is a flow diagram illustrating a method for peer network device discovery.

FIG. 5 is a flow diagram illustrating a method 70 for peer network device discovery. At step 72, an original first data packet is received from first network device 14 on second network device 16 on first network 12. In a preferred embodiment of the present invention, the first data packet is a TCP/IP packet (e.g., TCP/IP SYN segment 64, FIG. 4A) used to establish a TCP 38 connection from first network device 14 on first network 12 to fourth network device 22 on second network 18. However, other data packets from other networking protocols could also be used.

At step 74, peer discovery marker 46 from peer discovery protocol 44 is added to a header in the original first data packet on second network device 16 to create a modified first data packet. Peer discovery marker 46 includes a network address for second network device 16 (e.g., IP 32 address 128.10.20.30).

Figure 6:
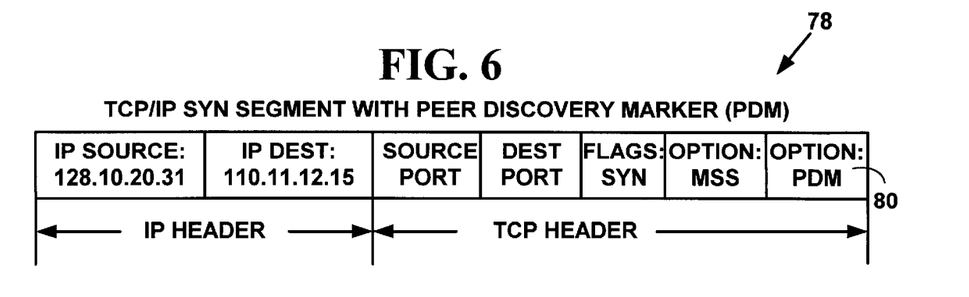
FIG. 6 is a block diagram illustrating a peer discovery data packet with a peer discovery marker.

FIG. 6 is a block diagram illustrating an exemplary peer discovery data packet 78 with a peer discovery marker 80 as a TCP 38 Option. Peer discovery data packet 78 is an exemplary modified first data packet created at step 74. In a preferred embodiment of the present invention, peer discovery marker appears as an additional TCP Option in the TCP 38 header. However, peer discovery marker 46 may also be placed in another part of the TCP 38 header or in another networking protocol header. In addition, the present invention is not limited to using the peer discovery marker 46 as a TCP 38 Option and other types of peer discovery data packets could also be used.

Returning to FIG. 5 at step 76, the modified first discovery data packet is sent from second network device 14 on first network 12, to third network device 20 on second network 18, via third network 24.

In a preferred embodiment of the present invention, first network device 14 (FIG. 1) transmits a TCP/IP SYN segment 64 (FIG. 4A) intended for fourth network device 22 (FIG. 1) to establish a TCP 38 connection. As TCP/IP SYN segment 64 passes through second network device 16 (i.e., a first edge router), second network device 16 puts its own IP 32 address (e.g., 128.10.20.30) in network address-field 52 (FIG. 3A) of peer discovery marker 46. Kind-field 48 is set to 128 and length-field 50 is set to six, since the peer discovery marker is 6-bytes long.

Peer discovery marker 46 is added to TCP 38 header as an additional TCP 38 Option identified by a option "kind" number of 128. The TCP 38 header is padded with TCP 38 No OPeration ("NOP") bytes until it ends on a four-byte boundary (i.e., 8-bytes). Since the TCP/IP SYN segments do not carry a data payload, adding a 6-byte peer discovery marker and two-bytes of padding for a total of 8-bytes, will not adversely increase the size of the SYN segment beyond any Message Transfer Unit ("MTU") previously defined by a network device.

Second network device 16 adjusts three fields in the TCP/IP SYN segment: IP 32 total length; TCP 38 header length; and TCP 38 checksum (fields not illustrated in the segments from FIG. 4). The IP 32 and TCP 38 header lengths are increased by a fixed amount corresponding to the length of peer discovery marker 46. In a preferred embodiment of the present invention, the TCP 38 checksum is computed by adding (e.g., in 16-bits 1's complement) the length of peer discovery marker 46 and associated padding to the original TCP 38 checksum. The original IP 32 length and TCP 38 header length values are subtracted from the TCP 38 checksum and the new IP 32 length and TCP 38 header length values are added to the TCP 38 checksum creating a new TCP 38 checksum. However, other methods can also be used to adjust the TCP 38 and IP header fields.

Figure 7:
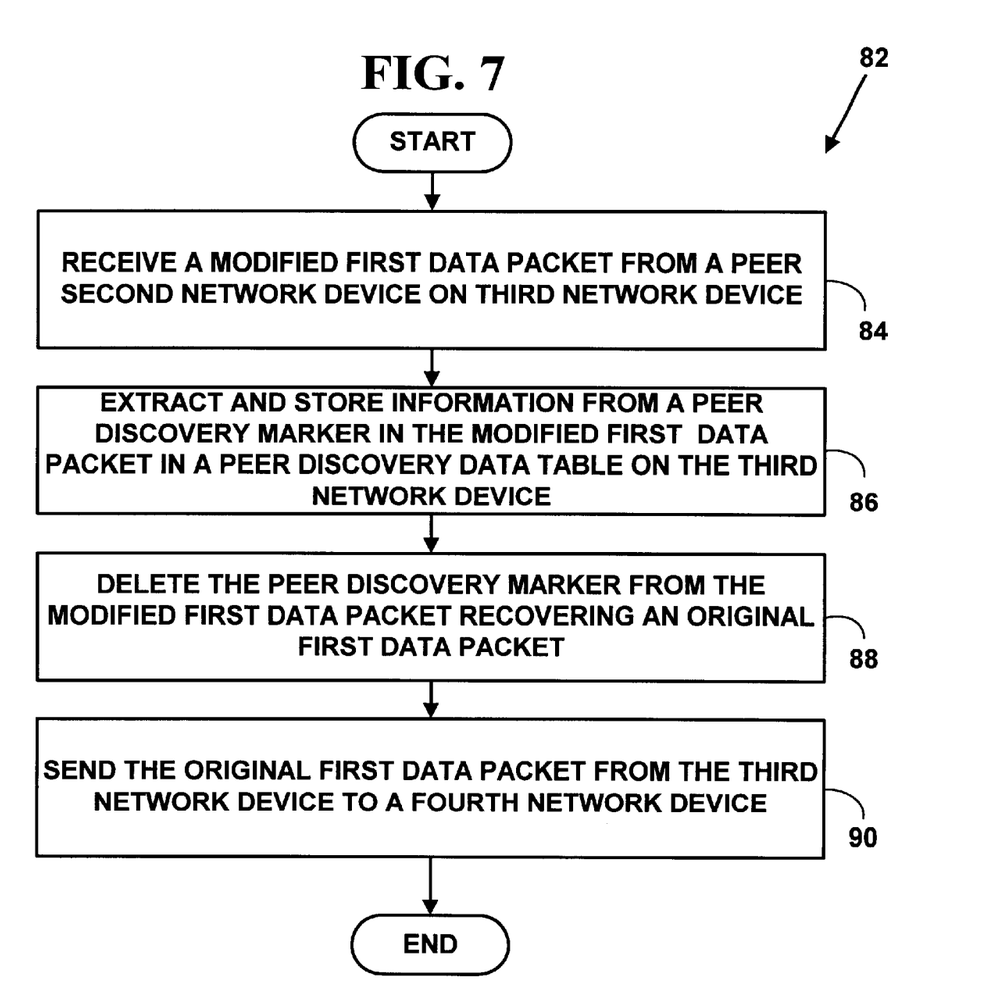
FIG. 7 is a flow diagram illustrating a method for peer network device discovery.

FIG. 7 is a flow diagram illustrating a method 82 for peer network device discovery. At step 84, a modified first data packet (e.g., a TCP/IP packet with a peer discovery marker 46 in a TCP 38 header) is received on third network device 20 (i.e., a second edge router) on second network 18 via the third network 24. At step 86, information from the peer discovery marker in 46 the modified first data packet is extracted and stored in a first peer discovery table on the third network device 20 (e.g., the network address of second network device 16). At step 88, peer discovery marker 46 is deleted from the header in the peer discovery data packet by third network device 20 to recover an original first data packet (e.g., TCP/IP SYN segment 64). At step 90, the original first data packet is sent to fourth network device 22.

In a preferred embodiment of the present invention, third network device 20 (i.e., second edge router) removes peer discovery marker 46 from TCP 38 header. The network address for the peer network device (e.(g., second network device 16) from peer discover marker 46 is stored in a peer discovery table along with the network address for the host network device associated with the peer network device from the IP 32 header (e.g., from the IP 32 source field).

Figure 8A:
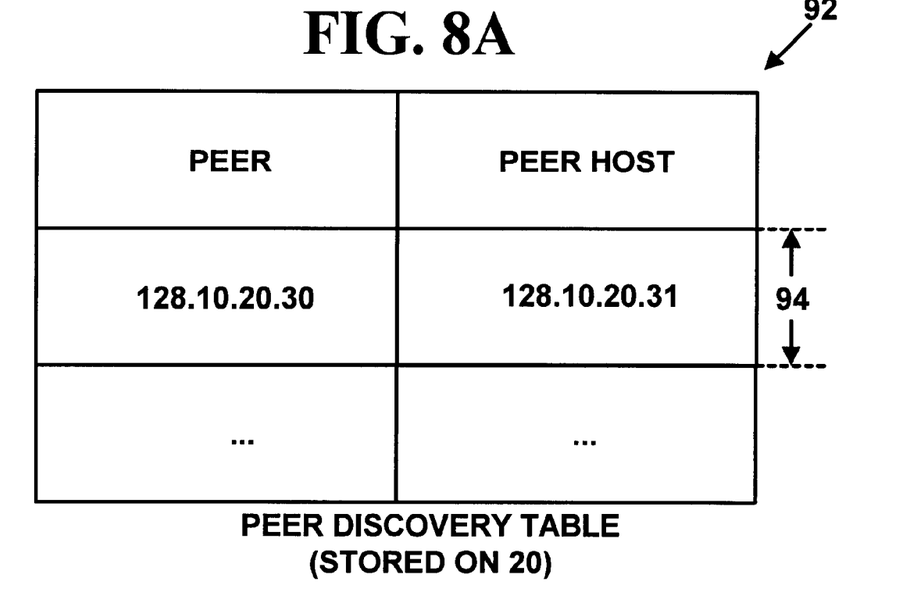
FIGS. 8A and 8B are block diagrams illustrating peer discovery tables.
Figure 8B:
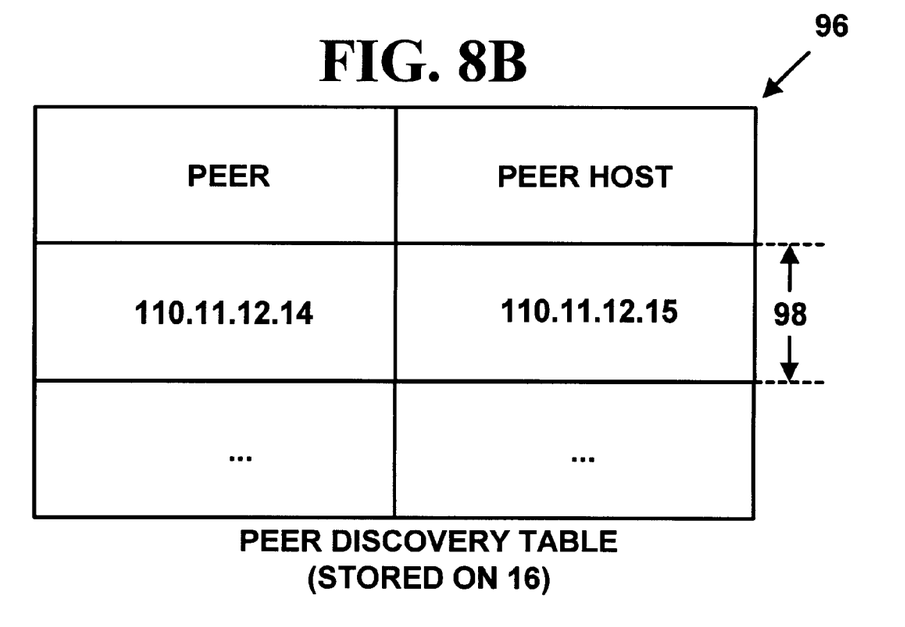

FIGS. 8A and 8B are block diagrams illustrating exemplary peer discovery tables. FIG. 8A is a block diagram illustrating an exemplary peer discovery table 92 for peer third network device 20 created as a result of execution of methods 70 (FIG. 5) and 82 (FIG. 7). Peer discovery table 86 (FIG. 8A) includes a network address (i.e., an IP 32 address 128.10.20.30) for a peer network device, which is second network device 16, and a network address for its associated host network device, first network device 14 (i.e., 128.10.20.31).

Third network device 20 re-calculates the IP 32 length, TCP 38 header length, and TCP 38 checksum fields using an inverse of the calculation described for adding peer discovery marker 46 to the TCP 38 header. However, other calculations can also be used for removing peer discovery 46. This inverse calculation recovers an original data packet (e.g., TCP/IP SYN segment 64), which is sent to fourth network device 22 to help establish a TCP 38 connection.

Figure 9:
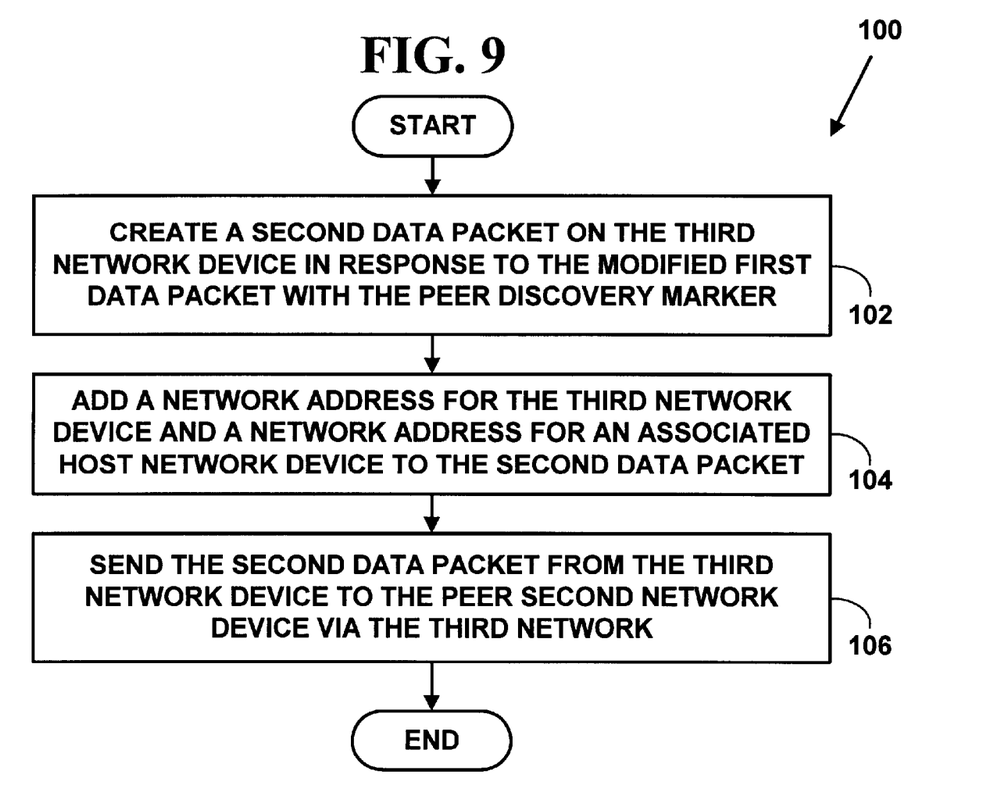
FIG. 9 is a flow diagram illustrating a method for peer network device discovery.

FIG. 9 is a flow diagram illustrating a method 100 for peer network device discovery. At step 102, a second data packet is created on third network device 20 after receiving a modified data packet with a peer discovery marker 46. In a preferred embodiment of the present invention, the second data packet is a TCP 38 data packet. However, other data packets could also be used (e.g., UDP 40 or other networking protocol data packets).

At step 104, third network device 20 adds its network address (e.g., IP 32 address 110.11.12.14) and a network address (e.g., IP 32 address 110.11.12.15) for an associated host network device to the second data packet.

At step 106, the second data packet is sent from third network device 20 on second network 18 to peer second network device 16 on first network 12 via third network 24. Third network device 20 uses the second data packet to initiate a two-way peer-to-peer data flow to peer second network device 16. The two-way peer-to-peer data flow is established outside of, and separate from, the TCP 38 connection being established between first network device 14 and fourth network device 22. For example, the second data packet is sent from third network device 20 to peer second network device 16 to establish a two-way peer-to-peer data flow connection as second network device 16 is sending the TCP 38 handshake segments illustrated in FIG. 4 to third network device 20 to establish a TCP 38 connection between first network device 12 and fourth network device 22.

Figure 10:
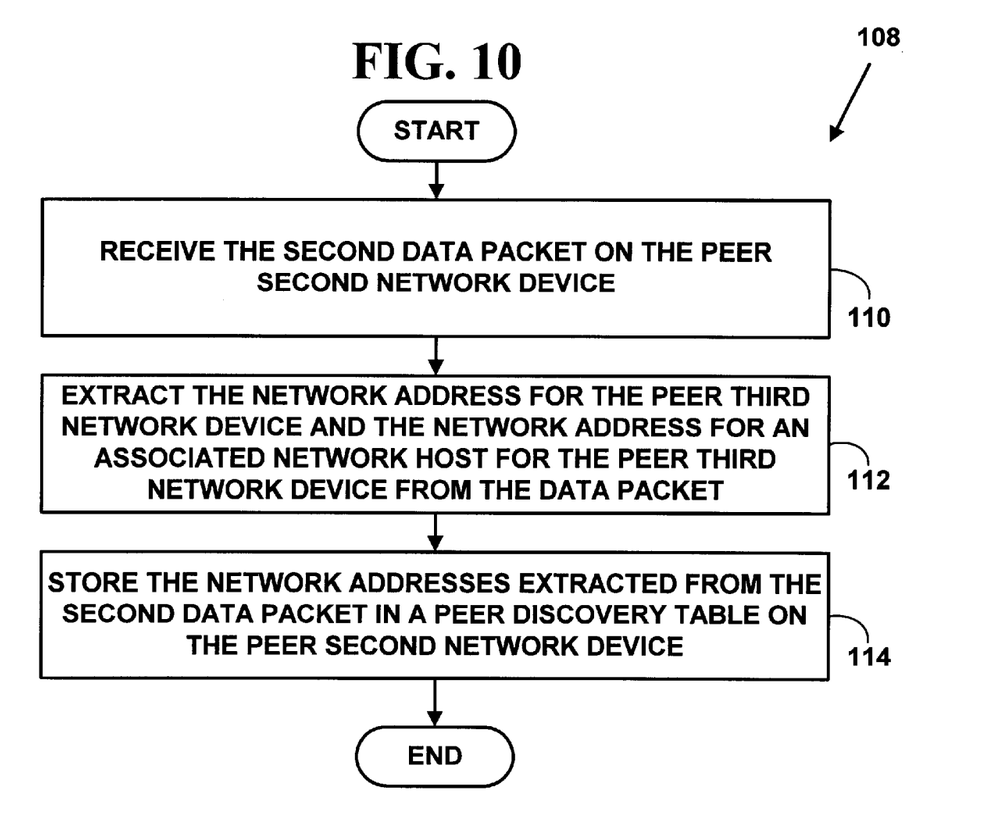
FIG. 10 is a flow diagram illustrating a method for peer network device discovery.

FIG. 10 is a flow diagram illustrating a method 108 for peer network device discovery. At step 110, a second data packet is received on second network device 16 on first network 12 via the third network 24 from third network device 20. At step 112, network address information for a peer network device and its associated peer host network device is extracted from the second data packet. At step 114, the network address information extracted from second data packet is stored in a peer discovery table (e.g., peer discovery table 96 of FIG. 8B) on second network device 16. Peer discovery table 96 (FIG. 8B) includes a network address (e.g., an IP 32 address) for a peer network device, which is third network device 20, and a network address for its associated host, fourth network device 22. Peer discovery table 96 includes an exemplary table entry 98 illustrating an network address (i.e., IP 32 address 10.11.12.14) for peer third network device 20 and its associated host, fourth network device 22 (i.e., IP 32 address 110.11.12.15).

In one embodiment of the present invention, peer third network device 20 and peer second network device 16 execute the TCP 38 handshake sequence illustrated in FIG. 4 and described above to establish a two-way peer-to-peer TCP 38 data flow (e.g., a TCP 38 channel) between peer network devices. However, other peer-to-peer data-flows may also be established between the peer network devices (e.g., a UDP 40 channel or other networking protocol channel).

A two-way, peer-to-peer data flow is established between the peer network devices (16, 20) via third network 24 as first network device 12 and fourth network device 22 are establishing a TCP 38 connection. The peer-to-peer data flow is separate from the TCP 38 connection established between first network device 14 and fourth network device 22.

Peer second network device 16 is able to determine that fourth network device 22 is reached via peer third network device 20 with peer discovery table 96. Peer third network device 20 is able to determine that first network device 14 is reached via peer second network device 16 with peer discovery table 92. The peer-to-peer network devices can now exchange routing "intelligent" routing capabilities, requests, or commands and other information. The exchange of information allows the peer network devices to exchange and negotiate "intelligent" edge router capabilities such as error correction, encryption, compression, and other data transmission parameters that may improve transmission bandwidth between Autonomous Systems.

In a preferred embodiment of the present invention, the modified first data packet is a TCP/IP data packet with a peer discovery marker 46 added to the TCP 48 header as an additional TCP 38 Option. In such an embodiment, if a network device receives a modified data packet with peer discovery marker 46, and the network device does not implement peer discovery protocol 44 and the peer discovery methods described herein, peer discovery marker 46 is ignored. The default action for TICP 38 upon receipt of an unknown TCP 38 Option is to silently ignore the unknown TCP 38 Option. Thus, attempting to use the peer discovery protocol and methods with TCP 38 described herein, should not have any adverse effects on existing network devices that do not implement peer discovery (i.e., assuming that a network device has a proper implementation of TCP 38 that handles unknown TCP 38 options correctly).

The peer discovery protocol and peer discovery method described here allow peer edge routers and other peer network devices to discover one another across a network like the Internet using existing networking protocols. The peer network devices can then provide "intelligent" edge router services such as error correction, encryption, compression and other services. The peer discovery protocol of the present invention is used with existing networking protocols used for the Internet and can be used with network devices that do not implement the peer discovery protocol without disruption. Thus, the peer discovery protocol and peer discovery methods of a preferred embodiment of the present invention may enhance performance, reliability and security of data transmitted over the Internet to and from Autonomous Systems or other subnets or networks.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. Therefore, all embodiments that come within the scope and spirit of the following claims and equivalents thereto are claimed as the invention.

We claim:

1. In a first network with a plurality of network devices connected to a second network with a plurality of network devices via a third network, a method of peer network device discovery, the method comprising the following steps:

receiving an original first data packet from a first network device on a second network device on the first network, wherein the first data packet is used to establish a connection from the first network device on the first network to a fourth network device on the second network;

adding a peer discovery marker from a peer discovery protocol to a header in the first data packet on the second network device to create a modified first data packet, wherein the peer discovery marker includes a network address for the second network device; and sending the modified first data packet from the second network device on the first network to a third network device on the second network via the third network.

2. The method of claim 1 further comprising:

receiving the modified first data packet on the third network device on the second network via the third network;

extracting information from the peer discovery marker in the modified first data packet;

storing information from the peer discovery marker in a first peer discovery table from a peer discovery protocol on the third network device;

deleting the peer discovery marker from the header in the modified first data packet on the third network device to recover the original first data packet; and sending the original first data packet to a fourth network device on the second network to establish a connection between the fourth network device and the first network device.

3. The method of claim 2 further comprising:

creating a second data packet on the third network device after receiving the modified first data packet;

adding a first network address for the third network device and a second network address for an associated host fourth network device to the second data packet; and sending the second data packet from the third network device on the second network to the second network device on the first network via the third network, thereby providing information for establishing a two-way peer-to-peer data flow between the third network device and the second network device.

4. The method of claim 3 further comprising:

receiving the second data packet on the second network device on the first network via the third network;

extracting a first network address for the peer third network device and a second network address for the for the associated host fourth network device from the second data packet; and storing the first network address and the second network address in a second peer discovery table from a peer discovery protocol on the second network device, thereby providing network addresses for establishing a two-way peer-to-peer data flow between the second network device and the third network device via the third network.

5. A computer readable medium having stored therein instructions for causing a central processing unit to execute the method of claim 1.

6. The method of claim 1 wherein the first network and second networks are Autonomous Systems and the third network is the Internet.

7. The method of claim 1 wherein the peer discovery marker includes a kind-field, a length-field and a network address-field for a Transmission Control Protocol Option.

8. The method of claim 1 wherein the first data packet is a Transmission Control Protocol packet with an Internet Protocol packet.

9. The method of claim 1 wherein the header in the first data packet is a Transmission Control Protocol header.

10. The method of claim 1 wherein the first network device is a network host computer and the second network device is an edge router.

11. The method of claim 1 wherein the peer discovery protocol includes a peer discovery marker and a peer discovery table.

12. The method of claim 1 wherein the step of adding a peer discovery marker includes re-calculating a length of the modified first data packet, a length of the header for the modified first data packet and a checksum for the header, with the peer discovery marker included in the header of the modified first data packet.

13. The method of claim 2 wherein the first peer discovery table includes a first network address-field for storing a first network address for a peer network device and a second network address-field for storing a second network address for an associated host network device for the peer network device.

14. The method of claim 2 wherein the step of deleting the peer discovery marker includes re-calculating a length of the original first data packet, a length of the header for the original first data packet, and a checksum for the header, without the peer discovery marker included in the header of the first data packet.

15. In a first network with a plurality of network devices connected to a second network with a plurality of network devices via a third network, a method of peer network device discovery, the method comprising the following steps:

receiving a first data packet with a peer discovery marker from a peer discovery protocol on a first network device;

extracting information from the peer discovery marker;

storing information from the peer discovery marker in a first peer discovery table from a peer discovery protocol on the first network device;

deleting the peer discovery marker from the header on the peer discovery data packet on the first network device to recover an original data packet without the peer discovery marker; and sending the first data packet to a host second network device associated with the first network device.

16. A computer readable medium having stored therein instructions for causing a central processing unit to execute the method of claim 15.

17. In a first network with a plurality of network devices connected to a second network with a plurality of network devices via a third network, a method of peer network device discovery, the method comprising the following steps:

receiving a second data packet on a first network device on the first network, wherein the second data packet is sent by a second network device on a second network in response to a first data packet including a peer discovery marker from a peer discovery protocol sent by the first network device;

extracting a first network address for the second network device and a second network address for a host network device associated with the second network device from the second data packet; and storing the first network address and the second network address in a peer discovery table from a peer discovery protocol on the first network device, thereby providing network addresses for establishing a two-way peer-to-peer data flow between the first network device and the second network device.

18. A computer readable medium having stored therein instructions for causing a central processing unit to execute the method of claim 17.

19. A computer readable medium having stored therein a set of routines for implementing peer discovery protocol, the protocol allowing a first network device on a first network to discover a peer second network device on a second network, the set of routines implementing the peer discovery protocol as data bits, the computer readable medium comprising:

a peer discovery marker, for creating a modified networking protocol data packet, wherein the peer discovery marker is added to a header of a networking protocol data packet and is used to discover a peer network device; and a peer discovery table, for recording network addresses for establishing a two-way peer-to-peer data flow between the first network device on the first network and the peer second network device on the second network via a third computer network with information from the peer discovery marker.

20. The computer readable medium of claim 19 wherein the peer discovery marker includes a kind-field, a length-field and a network address-field for a Transmission Control Protocol Option.

21. The computer readable medium of claim 19 wherein the peer discovery table includes a first network address-field for a peer network device and a second network address-field for an associated host network device for the peer network device.

22. The computer readable medium of claim 19 wherein the header is a Transmission Control Protocol header.

23. The computer readable medium of claim 19 wherein the networking protocol data packet is a Transmission Control Protocol packet with an Internet Protocol packet.

24. In a first network with a plurality of network devices connected to a second network with a plurality of network devices via a third network, the network devices including a plurality of edge routers, a method of peer network device discovery, the method comprising the following steps:

adding a peer discovery marker from a peer discovery protocol to a header in a first data packet on a first edge router to create a modified first data packet, wherein the peer discovery marker includes a first network address for the first edge router;

sending the peer discovery data packet from the first edge router on the first network to a second edge router on the second network via the third network;

receiving a second data packet on the first edge router, wherein the second data packet is sent by the second edge router on a second network in response to the modified first data packet;

extracting a second network address for the second edge router from the peer discovery marker and a third network address for a host network device associated with the second edge router from the second data packet; and storing the second network address and the third network address in a peer discovery table from a peer discovery protocol on the first edge router, thereby providing network addresses for establishing a two-way peer-to-peer data flow between the first edge router and the second edge router.

25. The method of claim 24, further comprising:

establishing a two-way peer-to-peer data-flow between the first edge router and the second edge router using the network addresses from the peer discovery table.

26. A computer readable medium having stored therein instructions for causing a central processing unit to execute the method of claim 24.

27. In a first network with a plurality of network devices connected to a second network with a plurality of network devices via a third network, the network devices including a plurality of edge routers, a method of peer network device discovery, the method comprising the following steps:

receiving a modified first data packet with a peer discovery protocol marker on a first edge router on the first network from a second edge router on the second network;

extracting a first network address for the second edge router from the peer discovery protocol marker and a second network address for a host network device associated with the second edge router from the modified first data packet;

storing the first network address for the second edge router from the peer discovery marker and the second network address from the modified first data packet in a peer discovery table from the peer discovery protocol on the first edge router;

creating a second data packet on the first edge router in response to the modified first data packet;

adding a third network address for the first edge router and a fourth network address for host network device associated with the first edge router to the second data packet;

sending the second data packet from first edge router on the first network to the second edge router on the second network via the third network, thereby providing network addresses for establishing a two-way peer-to-peer data-flow between the first edge router and the second edge router via the third network.

28. A computer readable medium having stored therein instructions for causing a central processing unit to execute the method of claim 27.

* * * * *